(12) United States Patent
Liu

(10) Patent No.: US 12,050,539 B2
(45) Date of Patent: Jul. 30, 2024

(54) DATA ACCESS METHOD AND APPARATUS AND STORAGE MEDIUM

(71) Applicant: Huawei Technologies Co., Ltd., Guangdong (CN)

(72) Inventor: Yang Liu, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/662,267

(22) Filed: May 6, 2022

(65) Prior Publication Data

US 2022/0261354 A1 Aug. 18, 2022

Related U.S. Application Data

(63) Continuation of application No. PCT/CN2020/119935, filed on Oct. 9, 2020.

(30) Foreign Application Priority Data

Nov. 8, 2019 (CN) .......................... 201911085845.4
Feb. 25, 2020 (CN) .......................... 202010117250.9

(51) Int. Cl.
*G06F 12/10* (2016.01)
*G06F 3/06* (2006.01)

(52) U.S. Cl.
CPC .......... *G06F 12/10* (2013.01); *G06F 3/0611* (2013.01); *G06F 3/0659* (2013.01); *G06F 3/0689* (2013.01); *G06F 2212/1024* (2013.01)

(58) Field of Classification Search
CPC ...... G06F 12/10; G06F 3/0611; G06F 3/0659; G06F 3/0689; G06F 2212/1024
See application file for complete search history.

(56) References Cited

U.S. PATENT DOCUMENTS

| 5,675,769 A * | 10/1997 | Ruff ...................... G06F 3/0607 711/170 |
| 10,203,876 B2 * | 2/2019 | Ogawa .................. G06F 3/0605 |
| 2006/0069848 A1 * | 3/2006 | Nalawadi .............. G06F 3/0659 711/112 |
| 2011/0082997 A1 | 4/2011 | Yochai et al. |
| 2012/0079229 A1 | 3/2012 | Jensen et al. |
| 2012/0210095 A1 | 8/2012 | Nellans et al. |
| 2013/0191601 A1 | 7/2013 | Peterson et al. |

(Continued)

FOREIGN PATENT DOCUMENTS

| CN | 1540524 A | 10/2004 |
| CN | 101604227 A | 12/2009 |

(Continued)

*Primary Examiner* — Kalpit Parikh
(74) *Attorney, Agent, or Firm* — WOMBLE BOND DICKINSON (US) LLP

(57) ABSTRACT

A data access method and apparatus and a storage medium are disclosed. In an embodiment, a storage device receives from a client a first data write request that includes target data to be written and an address of a service logical space corresponding to the target data; and determines, based on an address of the service logical space, a target hard disk in the storage device and an address of a hard disk logical space corresponding to the service logical space. The storage device further writes the target data into the target hard disk based on the address of the hard disk logical space.

12 Claims, 4 Drawing Sheets

---

A storage device receives a first data write request from a client, where the first data write request carries target data to be written and an address of a service logical space corresponding to the target data — 401

The storage device determines a target hard disk in a plurality of hard disks and an address of a hard disk logical space corresponding to the service logical space based on the address of the service logical space — 402

The storage device writes, in an append-only write manner, the target data into a physical space corresponding to the hard disk logical space and in the target hard disk based on the determined address of the hard disk logical space — 403

(56) References Cited

U.S. PATENT DOCUMENTS

2015/0227316 A1\* 8/2015 Warfield ............... G06F 3/0688
711/162
2016/0224260 A1\* 8/2016 Bandic ................ G06F 12/1009

FOREIGN PATENT DOCUMENTS

| CN | 101976223 A | 2/2011 |
| CN | 104820575 A | 8/2015 |
| CN | 110018966 A | 7/2019 |

\* cited by examiner

DATA ACCESS METHOD AND APPARATUS AND STORAGE MEDIUM

CROSS-REFERENCE TO RELATED APPLICATIONS

This application is a continuation of International Application No. PCT/CN2020/119935, filed on Oct. 9, 2020, which claims priority to Chinese Patent Application No. 201911085845.4, filed on Nov. 8, 2019 and Chinese Patent Application No. 202010117250.9, filed on Feb. 25, 2020. All of the aforementioned patent applications are hereby incorporated by reference in their entireties.

TECHNICAL FIELD

This disclosure relates to the field of data storage technologies, and in particular, to a data access method and apparatus and a storage medium.

BACKGROUND

With application of big data, streaming computing engines are becoming the mainstream. For streaming computing, data continuously arrives during the computing, which requires high real-time processing. Therefore, sequential read/write operations on the data need to be more efficient. Currently, data can be read/written in a hard disk only after being processed by a storage device. However, a current storage device is usually used to process data in an organization manner such as a block, a file, or an object, and cannot process streaming data which refers to a data sequence that arrives continuously over time. Therefore, before the data is processed by using the storage device, the organization manner of the data needs to be converted. In addition, most hard disks currently use a logical block address (LBA) access manner. After the data is processed by the storage device, and when the data needs to be written into the hard disk, an organization manner of the data in the storage device needs to be converted into an organization manner of the data in the hard disk. That is, in a current data access process, a logical address accessed by a client needs to be translated into a logical address for accessing the storage device, and the logical address for accessing the storage device needs to be translated into a logical address for accessing the hard disk. This leads to two times of translation, which causes relatively high overheads.

SUMMARY

This disclosure provides a data access method and apparatus and a storage medium, to reduce overheads and improve data read/write efficiency. The technical solutions are as follows:

In a first aspect, a data access method is provided, where the method is applied to a storage device, the storage device includes a plurality of hard disks. According to the method, the storage device receives a first data write request from a client, where the first data write request carries target data to be written and an address of a service logical space corresponding to the target data; determines a target hard disk in the plurality of hard disks and an address of a hard disk logical space corresponding to the service logical space based on the address of the service logical space; and writes, in an append-only write manner, the target data into a physical space corresponding to the hard disk logical space and in the target hard disk based on the determined address of the hard disk logical space.

In this aspect, the client requests the storage device to create the service logical space when needing to store data. The service logical space can have an address that may include an identifier and an offset of the service logical space. The identifier of the service logical space is used to uniquely identify the service logical space, and the offset is used to indicate length information of an area in a physical space allocated to the service logical space, and to which data is currently being written. The address of the hard disk logical space may also include an identifier and an offset of the hard disk logical space. The offset included in the address of the hard disk logical space may be the offset included in the address of the service logical space.

Append-only write may be understood as writing data in an append-only manner, that is, the append-only write manner means that the written data is organized based on a writing time sequence. In addition, after a process of a program writes data in this manner, the process subsequently does not perform a write operation on an area in which the data is located, and only performs a read operation.

According to the foregoing description, the offset is used to indicate the length information of the area, in which the data is currently written, in the physical space allocated to the service logical space, and the address of the hard disk logical space includes the identifier and the offset of the hard disk logical space. Therefore, the storage device may determine a start address in the physical space corresponding to the hard disk logical space and in the target hard disk based on the address of the hard disk logical space, and then start to write the target data from the start address.

In an embodiment of this disclosure, the client accesses the storage device by using the address of the service logical space. The storage device determines the address of the hard disk logical space by using the address of the service logical space, and further accesses the target hard disk based on the address of the hard disk logical space. Based on the foregoing description, the service logical space is specific to the client, and the hard disk logical space is specific to the target hard disk. Both the service logical space and the hard disk logical space are logical spaces. However, for ease of differentiation, different limitations are imposed. Therefore, it can be learned that a manner in which the client accesses the storage device and a manner in which the storage device accesses the target hard disk are the same. Therefore, when the storage device writes, in the append-only write manner, the target data into the physical space corresponding to the hard disk logical space and in the target hard disk, address translation in the hard disk is not performed. This reduces overheads and increases a data write rate.

The service logical space is specific to the client, and the hard disk logical space is specific to the hard disk. The service logical space that the client requests the storage device to create is to facilitate subsequent data access. In addition, generally, the storage device may include a plurality of hard disks. Therefore, to ensure reliability of subsequent data access, after creating the service logical space and the hard disk logical space, the storage device may obtain the identifier of the service logical space and the identifier of the hard disk logical space, and store a correspondence between the identifier of the service logical space and the identifier of the hard disk logical space. That is, a correspondence between the service logical space and the hard disk logical space is created.

For some hard disks, after an erase block is full of written data, all data in the erase block needs to be erased before new data can be written. For example, in a NAND medium hard disk, after an erase block is full of written data, all data in the erase block needs to be erased before new data can be written. In this way, when garbage collection is performed on the target hard disk, if all data in an erase block is invalid data, the erase block may be directly erased. If part of data in an erase block is invalid data and a remaining part of data is valid data, the valid data needs to be migrated. The valid data has been written once, and then is written again during the migration. This phenomenon is referred to as write amplification. To avoid write amplification in a garbage collection process, the hard disk logical space created in the target hard disk corresponds to one or more erase blocks, and data stored in the one or more erase blocks has a same cold/hot degree or a same life cycle.

That is, a size of the physical space allocated by the target hard disk to the created hard disk logical space is an integer multiple of a size of one erase block. When the data stored in the one or more erase blocks has the same cold/hot degree or the same life cycle, there is a high probability that all data in a same erase block simultaneously becomes invalid data or is valid data. Less probably, there is a case in which one part of the data is invalid data and the other part is valid data. Therefore, during garbage collection, data migration is reduced and thus write amplification is reduced.

In this embodiment of this disclosure, write amplification in the garbage collection process can be reduced by using the foregoing method, or by using another method. For example, in a process of creating the hard disk logical space in the target hard disk, a size of the hard disk logical space in the target hard disk is adjusted so that the size of the hard disk logical space is equal to an integer multiple of a size of one erase block.

In a second aspect, a data access apparatus is provided, and the data access apparatus has a function of implementing behavior of the data access method according to the first aspect. The data access apparatus includes one or more modules, and the one or more modules are configured to implement the data access method provided in the first aspect.

In a third aspect, a storage device is provided, where the storage device includes a processor and a memory, and the memory is configured to store a program for performing the data access method provided in the first aspect, and store data related to the data access method provided in the first aspect. The processor is configured to execute the program stored in the memory. An operating apparatus of the storage device may further include a communication bus, where the communication bus is configured to establish a connection between the processor and the memory.

In a fourth aspect, a computer-readable storage medium is provided. The computer-readable storage medium stores instructions. When the instructions run on a computer, the computer is enabled to perform the data access method according to the first aspect.

In a fifth aspect, a computer program product including instructions is provided. When the computer program product runs on a computer, the computer is enabled to perform the data access method according to the first aspect.

Technical effects obtained in the second aspect, the third aspect, the fourth aspect, and the fifth aspect are similar to technical effects obtained by the corresponding technical means in the first aspect, and details are not described herein.

The technical solutions provided in this disclosure may bring at least the following beneficial effects:

In various embodiments of this disclosure, the storage device may determine the target hard disk and the address of the hard disk logical space corresponding to the service logical space based on the address of the service logical space carried in the first data write request sent by the client, and further write the target data into the target hard disk based on the address of the hard disk logical space. That is, the client accesses the storage device by using the address of the service logical space. Inside the storage device, the address of the service logical space is translated into the address of the hard disk logical space. Data is written into the target hard disk based on the address of the hard disk logical space. Therefore, it can be learned that only one time of address translation is required, thereby reducing overheads and improving data read/write efficiency.

DESCRIPTION OF EMBODIMENTS

To make the objectives, technical solutions, and advantages of this disclosure clearer, the following further describes the embodiments of this disclosure in detail with reference to the accompanying drawings.

Before a data access method provided in the embodiments of this disclosure is explained in detail, an environment related to the embodiments of this disclosure is first described.

Figure 1:
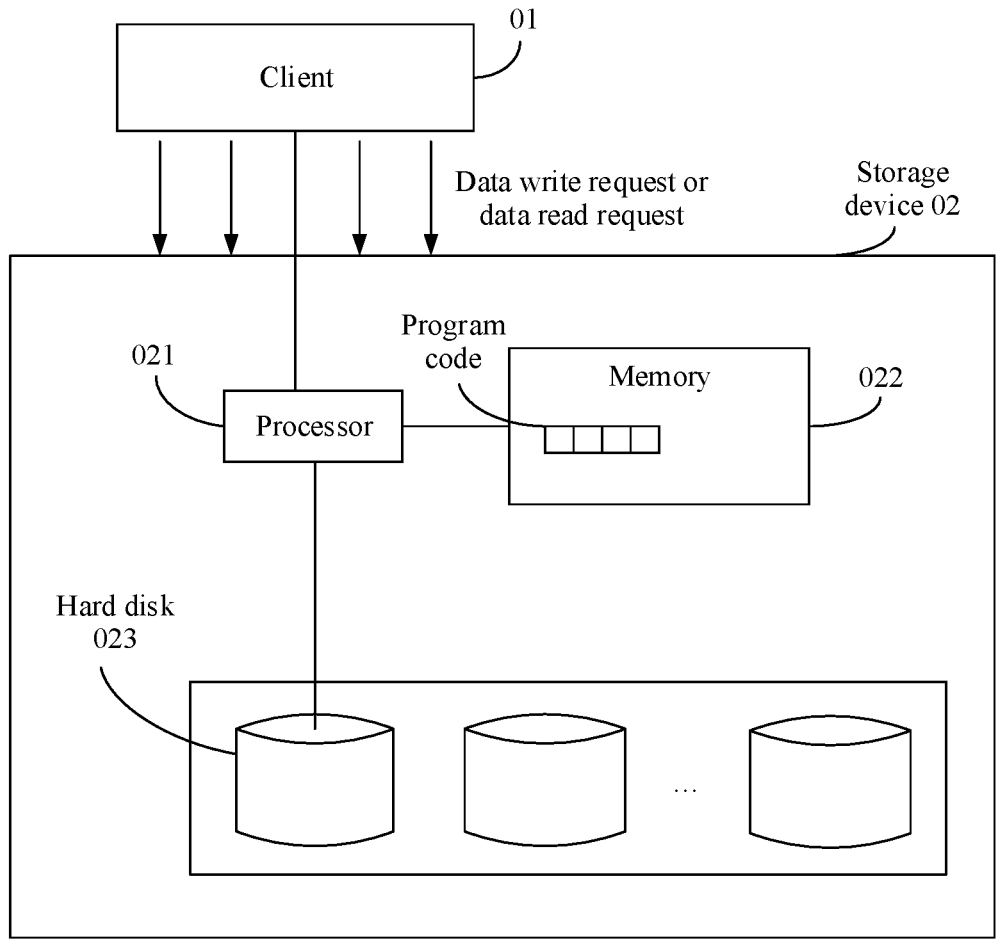
FIG. 1 is an architectural diagram of a storage system according to an embodiment of this disclosure.

FIG. 1 is an architectural diagram of a storage system shown according to a data access method provided in an embodiment of this disclosure. As shown in FIG. 1, the system includes a client 01 and a storage device 02, and a communication connection is established between the client 01 and the storage device 02.

The client 01 may send a data read request or a data write request to the storage device 02.

The storage device 02 may include a processor 021, a memory 022, and a hard disk 023.

The processor 021 may be a general-purpose central processing unit (CPU), a network processor (NP), or a microprocessor, or may be one or more integrated circuits configured to implement the solutions of this disclosure, for example, an application-specific integrated circuit (ASIC), a programmable logic device (PLD) or a combination thereof. The PLD may be a complex programmable logic device (CPLD), a field-programmable gate array (FPGA), a generic array logic (GAL), or any combination thereof.

In an embodiment, the storage device may include a plurality of processors 021. Each processor of these processors may be a single-core processor or may be a multi-core processor. The processor herein may refer to one or more devices, circuits, and/or devices including processing cores for processing data (for example, computer program instructions).

An operating system is installed on the memory 022. The processor 021 may implement data read/write by running the operating system. In addition, the memory 022 may further store program code of the solutions of this disclosure, and the processor 021 controls execution thereof. That is, the memory 022 is configured to store the program code for executing the solutions of this disclosure, and the processor 021 may execute the program code stored in the memory 022, to implement a data access method provided in the embodiment in FIG. 4 below.

The memory 022 may be a read-only memory (ROM), or may be a random access memory (RAM), or may be an electrically erasable programmable read-only memory (EEPROM), an optical disc (including a compact disc read-only memory (CD-ROM), a compact optical disc, a laser disc, a digital versatile disc, a Blu-ray disc, and the like), a magnetic disk storage medium or another magnetic storage device, or any other medium capable of being configured to carry or store desired program code that is in the form of an instruction or a data structure and capable of being accessed by a computer, but not limited thereto. The memory 022 may exist independently and is connected to the processor 021. Alternatively, the memory 022 may be integrated with the processor 021.

The storage device 02 may be a storage array, or may be a server. When the storage device 02 is a storage array, the storage device 02 includes a controller and several hard disks. The processor 021 and the memory 022 may be located in the controller of the storage array. The controller is connected to the several hard disks by using back-end interface cards. When the storage device 02 is a server, the processor 021, the memory 022, and several hard disks are all located inside the server. This embodiment does not limit a product form of the storage device 02. FIG. 1 is merely a schematic diagram of some components included in the device.

In addition, the storage device 02 may further include a communication bus and a communication interface (not shown in FIG. 1). The communication bus is configured to transmit information between components included in the storage device 02.

The communication interface is configured to communicate with another device or a communication network, such as Ethernet, a radio access network (RAN), and a wireless local area network (WLAN).

The following describes in detail the data access method provided in an embodiment of this disclosure. The method provided in this embodiment of this disclosure is applied to a storage device, and the storage device includes a plurality of hard disks. In this embodiment of this disclosure, data access is mainly implemented by using a logical space, that is, a client accesses data in the storage device by using the logical space. Therefore, for ease of understanding, a process in which the client requests to create the logical space is first described.

The storage device receives a first logical space creation request from the client, where the first logical space creation request carries a first logical space size. The storage device creates a service logical space, allocates an identifier to the service logical space, and sends the identifier of the service logical space to the client. Then, the storage device may further determine a target hard disk from the plurality of included hard disks based on the first logical space size, create a hard disk logical space in the target hard disk, allocate an identifier to the created hard disk logical space, and allocate, in the target hard disk, a physical space corresponding to the created hard disk logical space. A size of the physical space is the same as the first logical space size.

When the storage device includes a memory, a processor, and the hard disks, a process in which the storage device creates the hard disk logical space in the target hard disk and allocates, in the target hard disk, the physical space corresponding to the created hard disk logical space may be as follows: The processor runs an operating system installed on the memory, to send a second logical space creation request to the target hard disk, where the second logical space creation request carries the first logical space size. In this way, after receiving the second logical space creation request, the target hard disk may create the hard disk logical space, allocate the identifier to the created hard disk logical space, and allocate the physical space corresponding to the created hard disk logical space, where the size of the physical space is equal to the first logical space size. Then, the target hard disk may send the identifier of the created hard disk logical space to the processor.

In the plurality of included hard disks in the storage device, sizes of data currently stored in different hard disks may be different, that is, sizes of remaining storage spaces (or physical spaces) in the plurality of hard disks may be different. Therefore, when the storage device determines the target hard disk from the plurality of included hard disks based on the first logical space size, a size of a remaining storage space of each of the plurality of hard disks may be determined, and a hard disk whose remaining storage space has a size greater than or equal to the first logical space size is selected from the plurality of hard disks as the target hard disk.

Further, there may be one or more hard disks whose remaining storage spaces have sizes greater than or equal to the first logical space size. Therefore, if there are a plurality of hard disks whose remaining storage spaces have sizes greater than or equal to the first logical space size, the storage device may further select, from the plurality of hard disks based on a load balancing algorithm, a hard disk whose remaining storage space has a size greater than or equal to the first logical space size as the target hard disk.

For some hard disks, after an erase block is full of written data, all data in the erase block needs to be erased before new data can be written. For example, in a NAND medium hard disk, after an erase block is full of written data, all data in the erase block needs to be erased before new data can be written. In this way, when garbage collection is performed on the target hard disk, if all data in an erase block is invalid data, the erase block may be directly erased. If part of data in an erase block is invalid data and a remaining part of data is valid data, the valid data needs to be migrated. The valid data has been written once, and then is written again during the migration. This phenomenon is referred to as write amplification. To avoid write amplification in a garbage collection process, the hard disk logical space created in the target hard disk corresponds to one or more erase blocks, and data stored in the one or more erase blocks has a same cold/hot degree or a same life cycle. That is, a size of the physical space allocated by the target hard disk to the created hard disk logical space is an integer multiple of a size of one erase block. When the data stored in the one or more erase blocks has the same cold/hot degree or the same life cycle, there is a high probability that all data in a same erase block simultaneously becomes invalid data or is valid data. Less probably, there is a case in which one part of the data is invalid data and the other part is valid data. Therefore, during garbage collection, data migration is reduced and thus write amplification is reduced.

It should be noted that the size of the hard disk logical space created in the target hard disk may not be an integer multiple of a size of one erase block. In this case, an erase block may correspond to two hard disk logical spaces. To reduce data migration in a garbage collection process, and further reduce write amplification, data stored in the erase block may also have a same cold/hot degree, or have a same life cycle. To be specific, data corresponding to the two hard disk logical spaces may also have the same cold/hot degree, or have the same life cycle. In other words, when the target hard disk allocates physical spaces corresponding to the two hard disk logical spaces, the physical spaces corresponding to the two hard disk logical spaces are consecutive. Certainly, in some cases, a difference between cold/hot degrees of the data stored in the erase block is less than a specific threshold, or a difference between life cycles of the data stored in the erase block is less than a specific threshold.

Figure 2:
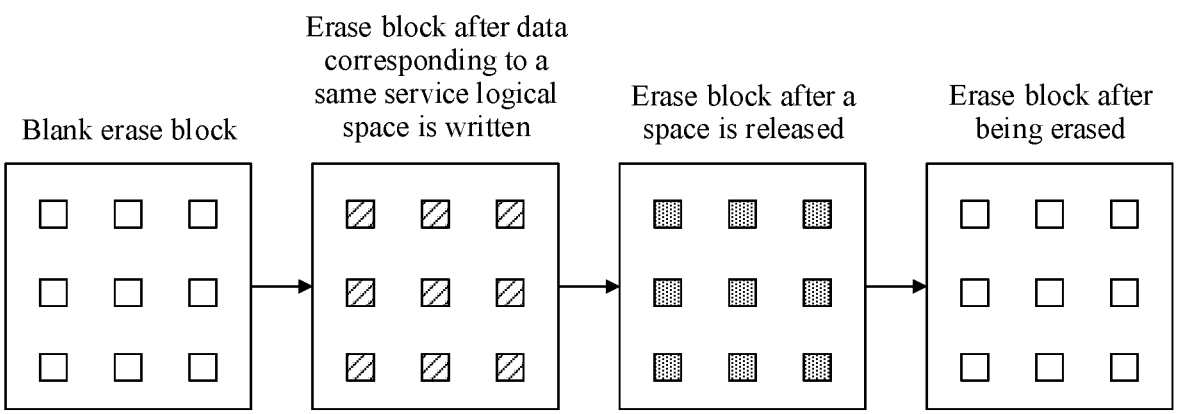
FIG. 2 is a schematic diagram of a data erasure process according to an embodiment of this disclosure.
Figure 3:
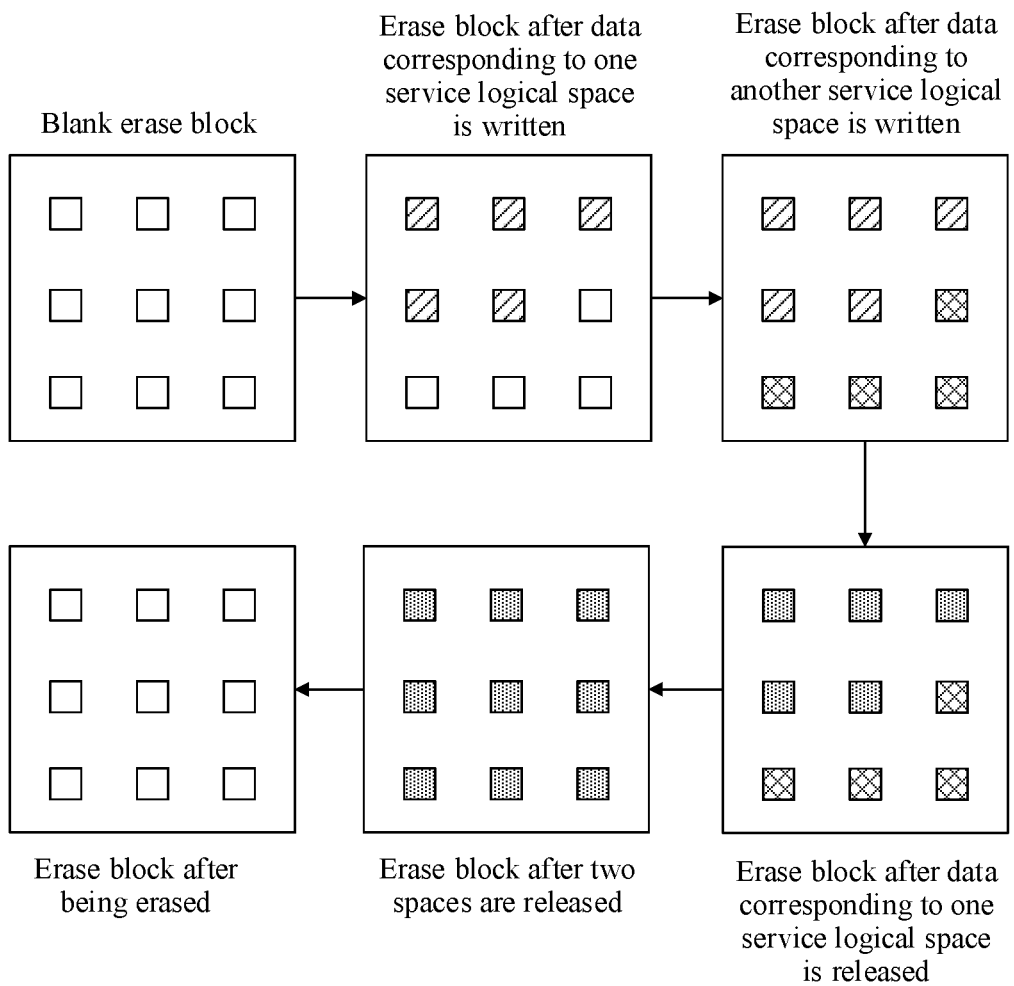
FIG. 3 is a schematic diagram of another data erasure process according to an embodiment of this disclosure.

For example, as shown in FIG. 2, for an erase block, if data corresponding to a same service logical space is written into the erase block, that is, the data written into the erase block has a same cold/hot degree, after a physical space corresponding to the service logical space is subsequently released, the erase block may be erased directly. However, as shown in FIG. 3, for an erase block, if data corresponding to two service logical spaces is written into the erase block, and cold/hot degrees of the data corresponding to the two service logical spaces are different, after a physical space corresponding to one of the service logical spaces is subsequently released, the data corresponding to the other service logical space is still valid. In this case, the erase block cannot be directly erased. The valid data needs to be migrated to erase the erase block. Therefore, in this embodiment of this disclosure, cold/hot degrees of data stored in a same erase block are set to be the same or similar, so that write amplification in the garbage collection process can be reduced.

In this embodiment of this disclosure, write amplification in the garbage collection process can be reduced by using the foregoing method, or by using another method. For example, in a process of creating the hard disk logical space in the target hard disk, a size of the hard disk logical space in the target hard disk is adjusted so that the size of the hard disk logical space is equal to an integer multiple of a size of one erase block.

The following describes two embodiments of adjusting the size of the hard disk logical space in the target hard disk.

In a first an embodiment, before the storage device creates the hard disk logical space in the target hard disk, the storage device may determine whether the first logical space size is an integer multiple of a size of one erase block. If the first logical space size is not an integer multiple of a size of one erase block, the storage device may determine a second logical space size, where the second logical space size is equal to an integer multiple of a size of one erase block. Then, the target hard disk is determined from the plurality of hard disks based on the second logical space size. Further, the hard disk logical space is created in the target hard disk, and in the target hard disk, the physical space corresponding to the created hard disk logical space is allocated. That is, the size of the physical space is the same as the second logical space size.

In a second an embodiment, before the storage device creates the hard disk logical space in the target hard disk, the storage device may determine whether the first logical space size is an integer multiple of a size of one erase block. If the first logical space size is not an integer multiple of a size of one erase block, the storage device may send a configuration recommendation message to the client, where the configuration recommendation message carries a second logical space size to be recommended, and the recommended second logical space size is an integer multiple of a size of one erase block. If the storage device receives a recommendation consent response sent by the client, the storage device determines the target hard disk from the plurality of hard disks based on the second logical space size, then creates the hard disk logical space in the target hard disk, and allocates, in the target hard disk, the physical space corresponding to the created hard disk logical space. That is, the size of the physical space is the same as the second logical space size.

In the foregoing two embodiments, the second logical space size may be greater than the first logical space size, and a difference between the second logical space size and the first logical space size is less than the size of one erase block.

It should be noted that in the foregoing two embodiments, the embodiment in which the storage device selects the target hard disk based on the second logical space size is the same as the foregoing embodiment in which the storage device selects the target hard disk based on the first logical space size. In addition, the embodiment in which the storage device creates the hard disk logical space in the target hard disk based on the second logical space size and allocates the physical space corresponding to the hard disk logical space is the same as the foregoing embodiment in which the storage device creates the hard disk logical space in the target hard disk based on the first logical space size and allocates the physical space corresponding to the hard disk logical space. Details are not described in this embodiment of this disclosure.

In addition, for the foregoing second embodiment, if the client does not agree with creating of the hard disk logical space based on the second logical space size, the storage device may implement write amplification reduction in a manner of storing, on a same erase block, data having a same or similar cold/hot degree or data having a same or similar life cycle.

Generally, there is an over-provisioning space in the hard disk. The over-provisioning space can be used to store migrated valid data during garbage collection. However, if processing is performed based on the foregoing method, migration of valid data in the garbage collection process can be avoided. In this way, a size of the over-provisioning space can be reduced, and more data can be stored in the hard disk, thereby reducing costs.

It can be learned based on the foregoing logical space creation process that the service logical space is specific to the client, and the hard disk logical space is specific to the hard disk. The service logical space that the client requests the storage device to create is to facilitate subsequent data access. In addition, generally, the storage device may include a plurality of hard disks. Therefore, to ensure reliability of subsequent data access, after the storage device obtains the identifier of the service logical space and the identifier of the hard disk logical space, the storage device may store a correspondence between the identifier of the service logical space and the identifier of the hard disk logical space. That is, a correspondence between the service logical space and the hard disk logical space is created. In addition, after the storage device determines the target hard disk from the plurality of hard disks, the storage device may further store a correspondence between an identifier of the target hard disk and the identifier of the service logical space. In an embodiment, the storage device may store a correspondence among the identifier of the service logical space, the identifier of the target hard disk, and the identifier of the hard disk logical space. In addition, for the target hard disk, the target hard disk may store a mapping relationship between the hard disk logical space and the physical space allocated to the hard disk logical space. That is, a mapping relationship between the identifier of hard disk logical space and an address range of the physical space allocated to the hard disk logical space is stored.

In an embodiment, when the logical space that the client requests to be created further has a data protection attribute, in addition to the first logical space size, the first logical space creation request further needs to carry a data protection attribute. The data protection attribute may include a plurality of copies, an erasure code (EC), and the like. The plurality of copies are used as an example. In a process in which the storage device creates a logical space based on the foregoing method, a plurality of target hard disks may be selected. That is, the plurality of selected target hard disks are in a one-to-one correspondence with the plurality of copies. Then, a hard disk logical space may be created in each target hard disk in the plurality of target hard disks based on the foregoing same method. Further, a correspondence among the identifier of the service logical space, an identifier of the target hard disk, and an identifier of the hard disk logical space is stored, so as to create a correspondence between the service logical space and the hard disk logical spaces in the plurality of target hard disks.

It should be noted that when the data protection attribute is the EC or another attribute, a process in which the storage device creates the logical space may be different from the foregoing process. However, a main idea is the same. Both processes are obtained by making appropriate variations based on the foregoing process and characteristics of different data protection attributes.

Figure 4:
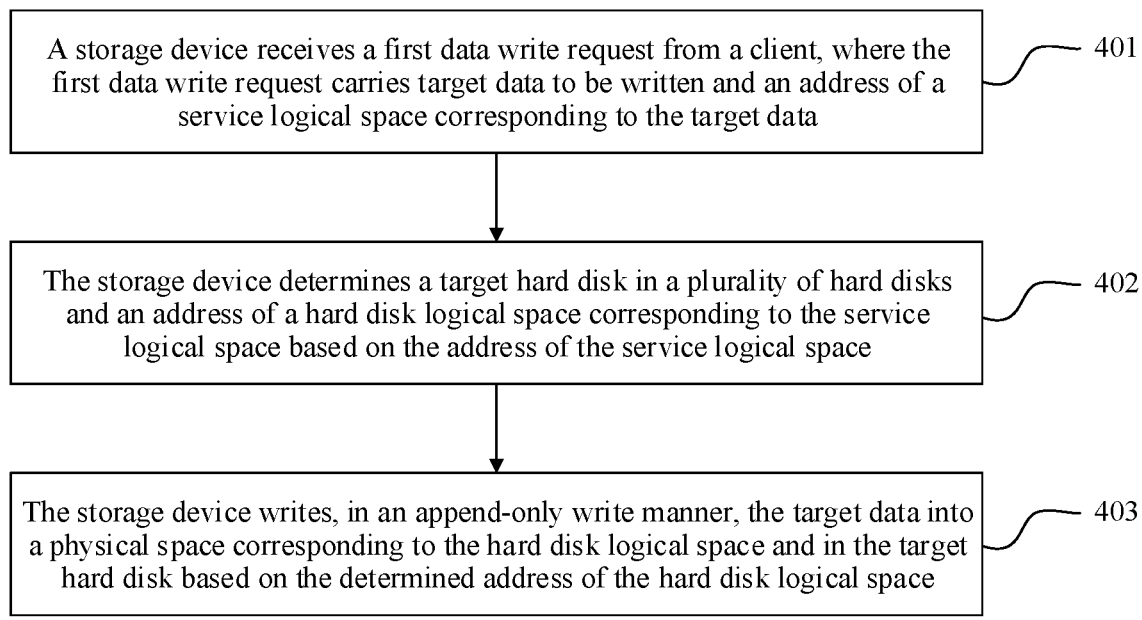
FIG. 4 is a flowchart of a data access method according to an embodiment of this disclosure.

After the process in which the client requests to create the logical space is described, the data access method provided in the embodiments of this disclosure is described next. FIG. 4 is a flowchart of a data access method according to an embodiment of this disclosure. The method includes the following steps.

Step 401: A storage device receives a first data write request from a client, where the first data write request carries target data to be written and an address of a service logical space corresponding to the target data.

Based on the foregoing description, the client requests the storage device to create the service logical space when needing to store data. The address of the service logical space may include an identifier and an offset of the service logical space. The identifier of the service logical space is used to uniquely identify the service logical space, and the offset is used to indicate length information of an area, in which data is currently written, in a physical space allocated to the service logical space.

Step 402: The storage device determines a target hard disk in a plurality of hard disks and an address of a hard disk logical space corresponding to the service logical space based on the address of the service logical space.

In a process of creating the logical space, the storage device stores a correspondence among the identifier of the service logical space, an identifier of the target hard disk, and an identifier of the hard disk logical space. Therefore, the storage device may determine the identifier of the target hard disk and the identifier of the hard disk logical space from the correspondence based on the identifier of the service logical space.

It should be noted that the address of the hard disk logical space may also include the identifier and an offset of the hard disk logical space. The offset included in the address of the hard disk logical space may be the offset included in the address of the service logical space.

Step 403: The storage device writes, in an append-only write manner, the target data into a physical space corresponding to the hard disk logical space and in the target hard disk based on the determined address of the hard disk logical space.

Append-only write may be understood as writing data in an append-only manner, that is, the append-only write manner means that the written data is organized based on a writing time sequence. In addition, after a process of a program writes data in this manner, the process subsequently does not perform a write operation on an area in which the data is located, and only performs a read operation.

According to the foregoing description, the offset is used to indicate length information of an area in which data is currently written, in the physical space allocated to the service logical space, and the address of the hard disk logical space includes the identifier and the offset of the hard disk logical space. Therefore, the storage device may determine a start address in the physical space corresponding to the hard disk logical space and in the target hard disk based on the address of the hard disk logical space, and then start to write the target data from the start address.

When the storage device includes a memory, a processor, and a hard disk, a process in which the storage device writes, in the append-only write manner, the target data into the physical space corresponding to the hard disk logical space and in the target hard disk based on the determined address of the hard disk logical space is as follows: The processor runs an operating system installed on the memory; so as to send a second data write request to the target hard disk, where the second data write request carries the target data and the determined address of the hard disk logical space. After receiving the second data write request, the target hard disk writes, in the appended write manner, the target data into the physical space corresponding to the hard disk logical space based on the address of the hard disk logical space.

The target hard disk stores a mapping relationship between the identifier of the hard disk logical space and an address range of the physical space allocated to the hard disk logical space. Therefore, after receiving the second data write request, the target hard disk may determine, based on the identifier of the hard disk logical space, the address range of the physical space allocated to the hard disk logical space from the mapping relationship. Further, a start address is determined in the address range based on the offset included in the address of the hard disk logical space, and the target data is written starting from the start address.

In this embodiment of this disclosure, the client accesses the storage device by using the address of the service logical space. The storage device determines the address of the hard disk logical space by using the address of the service logical space, and further accesses the target hard disk based on the address of the hard disk logical space. Based on the foregoing description, the service logical space is specific to the client, and the hard disk logical space is specific to the target hard disk. Both the service logical space and the hard disk logical space are logical spaces. However, for ease of differentiation, different limitations are imposed. Therefore, it can be learned that a manner in which the client accesses the storage device and a manner in which the storage device accesses the target hard disk are the same. Therefore, when the storage device writes, in the append-only write manner, the target data into the physical space corresponding to the hard disk logical space and in the target hard disk, address translation in the hard disk is not performed. This reduces overheads and increases a data write rate.

In some embodiments, the storage device may further write metadata corresponding to the service logical space into the target hard disk. In particular, after the service logical space is closed, the metadata needs to be written into the target hard disk, so as to make the metadata persistent. The metadata includes information related to the hard disk logical space, for example, a total size of the hard disk logical space, a size of currently written data, and an end location of the currently written data. A process in which the storage device writes the metadata is similar to the process of writing the target data. Details are not described in this embodiment of this disclosure.

It should be noted that a physical space in the target hard disk and corresponding to the metadata corresponding to the service logical space may be different from the physical space corresponding to the address of the hard disk logical space and in the target hard disk. In other words, the storage device may create a logical space in the target hard disk, where a physical space corresponding to the logical space is different from the physical space corresponding to the hard disk logical space, and the physical space corresponding to the logical space is used to store the metadata corresponding to the service logical space.

Operations 401 to 403 represent a process in which the storage device writes data based on the logical space. The following describes a process in which the storage device reads the data based on the logical space.

The storage device receives a first data read request from the client. The first data read request carries a length of data to be read and an address of a service logical space corresponding to the data to be read. The storage device determines a target hard disk in the plurality of hard disks and an address of a hard disk logical space corresponding to the service logical space based on the address of the service logical space. Then, the storage device may read the data from a physical space corresponding to the hard disk logical space and in the target hard disk based on the length of the data to be read and the address of the hard disk logical space.

It should be noted that in a data reading process, the address of the service logical space also includes an identifier and an offset of the service logical space. However, different from that in a data writing process, the offset is used to indicate information about a length between a start address of the data to be read and a start address of the physical space allocated to the service logical space. A manner in which the storage device determines the target hard disk in the plurality of hard disks and the address of the hard disk logical space corresponding to the service logical space based on the address of the service logical space is the same as the manner in step 402. Details are not described in this embodiment of this disclosure.

A process in which the storage device reads the data from the physical space corresponding to the hard disk logical space and in the target hard disk based on the length of the data to be read and the address of the hard disk logical space may be as follows: The storage device determines a start address in the physical space corresponding to the hard disk logical space and in the target hard disk based on the address of the hard disk logical space, and then starts to read the data from the start address based on the length of the data to be read.

When the storage device includes the memory, the processor, and the hard disk, a process in which the storage device determines the start address in the physical space corresponding to the hard disk logical space and in the target hard disk based on the address of the hard disk logical space is as follows: The processor runs the operating system installed on the memory, to send a second data read request to the target hard disk, where the second data read request carries the length of the data to be read and the address of the determined hard disk logical space. After receiving the second data read request, the target hard disk determines the start address in the physical space corresponding to the hard disk logical space and in the target hard disk based on the address of the hard disk logical space.

The target hard disk stores a mapping relationship between the identifier of the hard disk logical space and an address range of the physical space allocated to the hard disk logical space. Therefore, after receiving the second data read request, the target hard disk may determine, based on the identifier of the hard disk logical space, the address range of the physical space allocated to the hard disk logical space from the mapping relationship. Further, the start address is determined in the address range based on the offset included in the address of the hard disk logical space.

Similar to that in the data writing process, when the data is read from the physical space corresponding to the hard disk logical space and in the target hard disk, address translation in the hard disk is also not performed, thereby reducing overheads and increasing a data read rate.

It should be noted that after the storage device creates the service logical space and the hard disk logical space, states of the service logical space and the hard disk logical space are in an open state by default. However, subsequently, if the physical space corresponding to the hard disk logical space is full of data subsequently, the client requests to close the service logical space, or if the service logical space is closed due to an exception, the storage device may set both the state of the service logical space and the state of the hard disk logical space in the target hard disk to a closed state. In this way, subsequently data cannot be written by using the service logical space and the hard disk logical space in the target hard disk, but data can still be normally read.

Because the target hard disk may periodically maintain resources, the storage device not only sets the state of the service logical space to the closed state, but also needs to set the state of the hard disk logical space in the target hard disk to the closed state. In this way, when the target hard disk maintains resources, the physical space corresponding to the hard disk logical space and in the closed state may not be maintained, thereby saving resources.

If the client requests to delete the service logical space, the storage device may set both the state of the service logical space and the state of the hard disk logical space to a deleted state, and release the corresponding physical space. In this way, during garbage collection, the physical space corresponding to the hard disk logical space and in the deleted state may be erased.

Because the logical space provided in the embodiments of this disclosure has some similar features to a log, the logical space may be referred to as a persistence log (plog), and a method for operating the logical space is referred to as a plog interface. That is, both the processor and the hard disk of the storage device provide the plog interface. For example, in a storage system shown in FIG. 5, a solid state drive (SSD) is used as an example of a hard disk for description. A client is installed on a user host, a storage device provides a plog interface for the user host, and the SSD drive also provides a plog interface. In this way, when the client needs to access data in the storage device, the client may interact with the storage device based on the plog interface provided by the storage device for the user host, and data transmission may also be performed inside the storage device based on the plog interface, ensuring that access manners are consistent, so that a data organization manner does not need to be converted, and data read/write efficiency is very high. In addition, the storage device does not need to manage a physical space in the hard disk and does not need to process a complex task such as garbage collection, thereby greatly simplifying the storage system.

Figure 5:
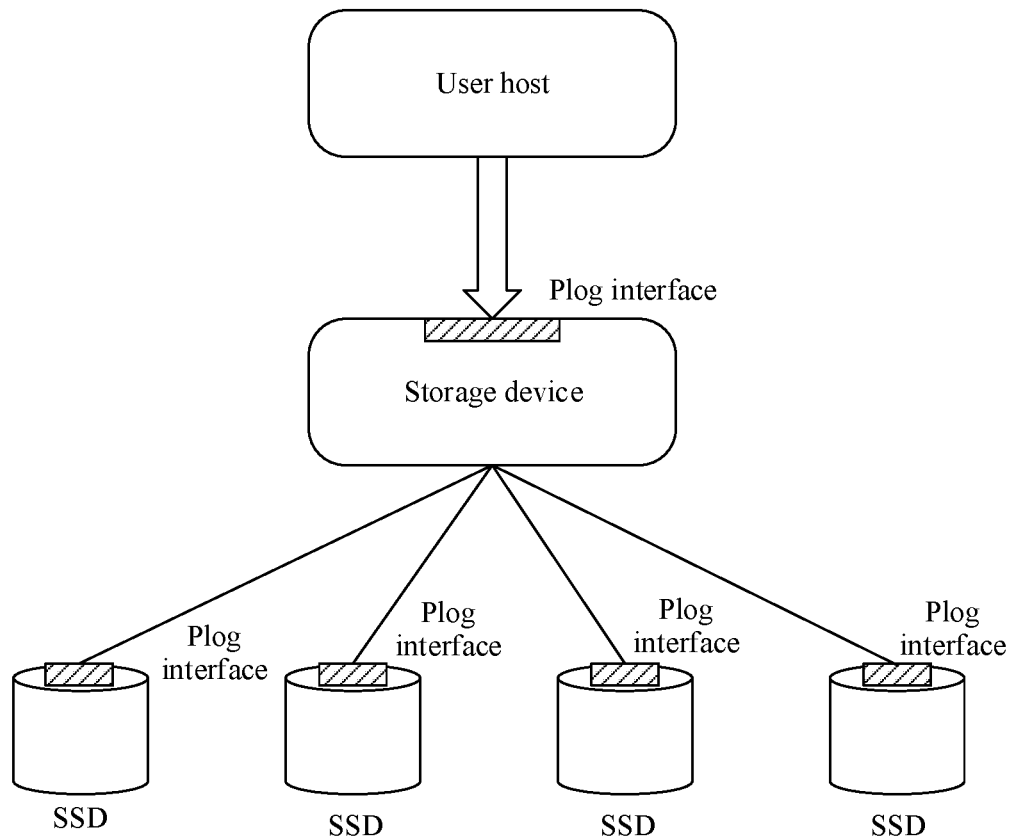
FIG. 5 is an architectural diagram of another storage system according to an embodiment of this disclosure.

In some embodiments, for the storage system shown in FIG. 5, an intelligent network interface card may be disposed in both the user host and the storage device. In this way, data read/write may be directly implemented by using the intelligent network interface card subsequently, without participation of a processor in the storage device. That is, when data is written, the client may send the data to the intelligent network interface card of the storage device by using the intelligent network interface card in the user host, and the intelligent network interface card of the storage device may identify the received data, so as to write the data into the hard disk. A case of reading data is similar to this. In this way, in a process of implementing data read/write by using the intelligent network interface card, the processor of the storage device may further process another task in parallel.

It should be noted that although data read/write may be implemented by using the intelligent network interface card, a control-layer operation further requires participation of the processor of the storage device. For example, operations such as creating, deleting, and closing a logical space further require participation of the processor of the storage device.

In this embodiment of this disclosure, the storage device may determine the target hard disk and the address of the hard disk logical space corresponding to the service logical space based on the address of the service logical space carried in first data write request sent by the client, and further write the target data into the target hard disk based on the address of the hard disk logical space. That is, the client accesses the storage device by using the address of the service logical space. Inside the storage device, the address of the service logical space is translated into the address of the hard disk logical space. Data is written into the target hard disk based on the address of the hard disk logical space. Therefore, it can be learned that only one time of address translation is required, thereby reducing overheads and improving data read/write efficiency.

Figure 6:
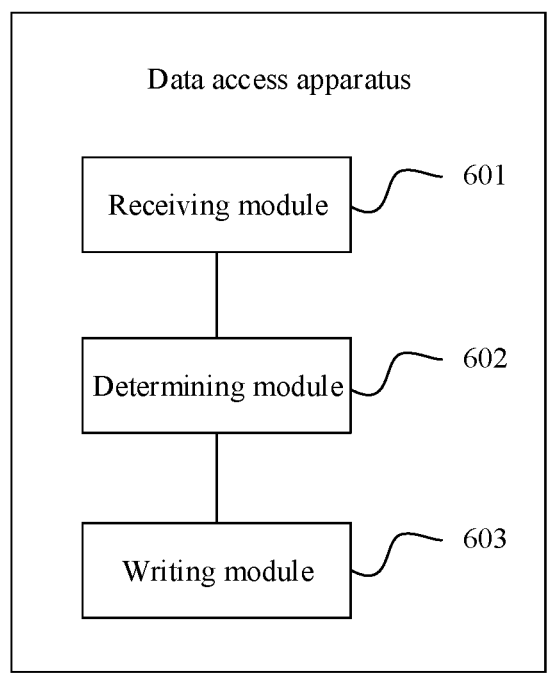
FIG. 6 is a schematic structural diagram of a data access apparatus according to an embodiment of this disclosure.

FIG. 6 is a schematic structural diagram of a data access apparatus according to an embodiment of this disclosure. The apparatus is located in a storage device, and is executed by a processor 021 by invoking program code in a memory 022. The apparatus may be implemented as a part or all of the storage device by using software, hardware, or a combination of the two. The storage device may include a plurality of hard disks. Referring to FIG. 6, the apparatus includes a receiving module 601, a determining module 602, and a writing module 603.

The receiving module 601 is configured to receive a first data write request from a client, where the first data write request carries target data to be written and an address of service logical space corresponding to the target data;

the determining module 602 is configured to determine a target hard disk in the plurality of hard disks and an address of a hard disk logical space corresponding to the service logical space based on the address of the service logical space; and the writing module 603 is configured to write, in an append-only write manner, the target data into a physical space corresponding to the hard disk logical space and in the target hard disk based on the determined address of the hard disk logical space.

Optionally, when the target data is written into the physical space corresponding to the hard disk logical space and in the target hard disk in the append-only write manner, address translation in the hard disk is not performed.

In an embodiment, the apparatus further includes:
a creation module, configured to create a correspondence between the service logical space and the hard disk logical space.

In an embodiment, the hard disk logical space corresponds to one or more erasure blocks, and data stored in the one or more erasure blocks has a same cold/hot degree or a same life cycle.

In an embodiment, the apparatus further includes:
an adjustment module, configured to adjust a size of the hard disk logical space, so that the size of the hard disk logical space is equal to an integer multiple of a size of one erase block.

In this embodiment of this disclosure, the storage device may determine the target hard disk and the address of the hard disk logical space corresponding to the service logical space based on the address of the service logical space carried in the first data write request sent by the client, and further write the target data into the target hard disk based on the address of the hard disk logical space. That is, the client accesses the storage device by using the address of the service logical space. Inside the storage device, the address of the service logical space is translated into the address of the hard disk logical space. Data is written into the target hard disk based on the address of the hard disk logical space. Therefore, it can be learned that only one time of address translation is required, thereby reducing overheads and improving data read/write efficiency.

It may be noted that, when data access apparatus provided in the foregoing embodiments accesses data, only division into the foregoing function modules is used as an example for description. During actual application, the foregoing functions may be allocated to different function modules and implemented according to a requirement, that is, an inner structure of the apparatus is divided into different function modules to implement all or some of the functions described above. In addition, the data access apparatus provided in the foregoing embodiment belongs to a same concept as the data access method embodiment. For a specific process, refer to the method embodiment. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like. It should be noted that the computer-readable storage medium mentioned in this disclosure may be a non-volatile storage medium, in other words, may be a non-transitory storage medium.

It should be understood that "at least one" mentioned in this specification refers to one or more, and "a plurality of" refers to two or more. In description of this disclosure, "I" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to facilitate clear description of the technical solutions in the embodiments of this disclosure, in the embodiments of this disclosure, words such as "first" and "second" are used to distinguish between same or similar items whose functions and effects are basically the same. A person skilled in the art may understand that the words such as "first" and "second" do not limit a quantity or an execution sequence, and the words such as "first" and "second" do not mean being definitely different.

What is claimed is:

1. A method for data accessing in a storage device, comprising:
    receiving, by the storage device, a first data write request from a client, wherein the first data write request includes target data to be written and an address of a service logical space corresponding to the target data;
    determining, by the storage device, a target hard disk in a plurality of hard disks of the storage device and an address of a hard disk logical space corresponding to the service logical space based on the address of the service logical space, wherein the hard disk logical space corresponds to one or more erase blocks, and wherein a difference between life cycles of data stored in each erase block of the one or more erase blocks is less than a threshold; and
    writing, by the storage device in an append-only write manner, the target data into a physical space in the target hard disk based on the determined address of the hard disk logical space, wherein the physical space corresponds to the hard disk logical space, wherein the writing the target data into the physical space in the target hard disk does not require an address translation in the target hard disk.

2. The method according to claim 1, wherein before the receiving of the first data write request from the client, the method further comprises:
    creating a correspondence between the service logical space and the hard disk logical space.

3. The method according to claim 1, wherein data stored in the one or more erase blocks has a same cold/hot degree or a same life cycle.

4. The method according to claim 1, wherein the method further comprises:
    adjusting a size of the hard disk logical space, wherein the size of the hard disk logical space after being adjusted is equal to an integer multiple of a size of one erase block.

5. A storage device, comprising:
    a plurality of hard disks; and
    a processor coupled to the plurality of the hard disks and configured to:
        receive a first data write request from a client, wherein the first data write request includes target data to be written and an address of a service logical space corresponding to the target data;
        determine a target hard disk in the plurality of hard disks and an address of a hard disk logical space corresponding to the service logical space based on the address of the service logical space, wherein the hard disk logical space corresponds to one or more erase blocks, and wherein a difference between life cycles of data stored in each erase block of the one or more erase blocks is less than a threshold; and
        write, in an append-only write manner, the target data into a physical space in the target hard disk based on the determined address of the hard disk logical space, wherein the physical space corresponds to the hard disk logical space, wherein the writing the target data into the physical space in the target hard disk does not require an address translation in the target hard disk.

6. The storage device according to claim 5, wherein the processor is further configured to:
    create a correspondence between the service logical space and the hard disk logical space.

7. The storage device according to claim 5, wherein data stored in the one or more erase blocks has a same cold/hot degree or a same life cycle.

8. The storage device according to claim 5, wherein the processor is further configured to:
    adjust a size of the hard disk logical space, wherein the size of the hard disk logical space after being adjusted is equal to an integer multiple of a size of one erase block.

9. A computer-readable storage medium, wherein the computer-readable storage medium stores a computer program, which when executed by a processor, causes the processor to perform operations, the operations comprising:
    receiving a first data write request from a client, wherein the first data write request includes target data to be written and an address of a service logical space corresponding to the target data;
    determining, based on the address of the service logical space, a target hard disk in a plurality of hard disks of a storage device and an address of a hard disk logical space corresponding to the service logical space, wherein the hard disk logical space corresponds to one or more erase blocks, and wherein a difference between life cycles of data stored in each erase block of the one or more erase blocks is less than a threshold; and
    writing in an append-only write manner, the target data into a physical space in the target hard disk based on the determined address of the hard disk logical space, wherein the physical space corresponds to the hard disk logical space, wherein the writing the target data into the physical space in the target hard disk does not require an address translation in the target hard disk.

10. The computer-readable storage medium according to claim 9, wherein the operations further comprise:

creating a correspondence between the service logical space and the hard disk logical space before receiving a first data write request from a client.

11. The computer-readable storage medium according to claim 9, wherein data stored in the one or more erase blocks has a same cold/hot degree or a same life cycle.

12. The computer-readable storage medium according to claim 9, wherein the operations further comprise:
adjusting a size of the hard disk logical space, wherein the size of the hard disk logical space after being adjusted is equal to an integer multiple of a size of one erase block.

\* \* \* \* \*